J. GOULD.
Animal-Traps.

No. 139,572. Patented June 3, 1873.

Witnesses:

Inventor:
J. Gould
Per
Attorneys.

UNITED STATES PATENT OFFICE.

JOHN GOULD, OF CLINTON, PENNSYLVANIA.

IMPROVEMENT IN ANIMAL-TRAPS.

Specification forming part of Letters Patent No. 139,572, dated June 3, 1873; application filed March 29, 1873.

*To all whom it may concern:*

Figure 1:
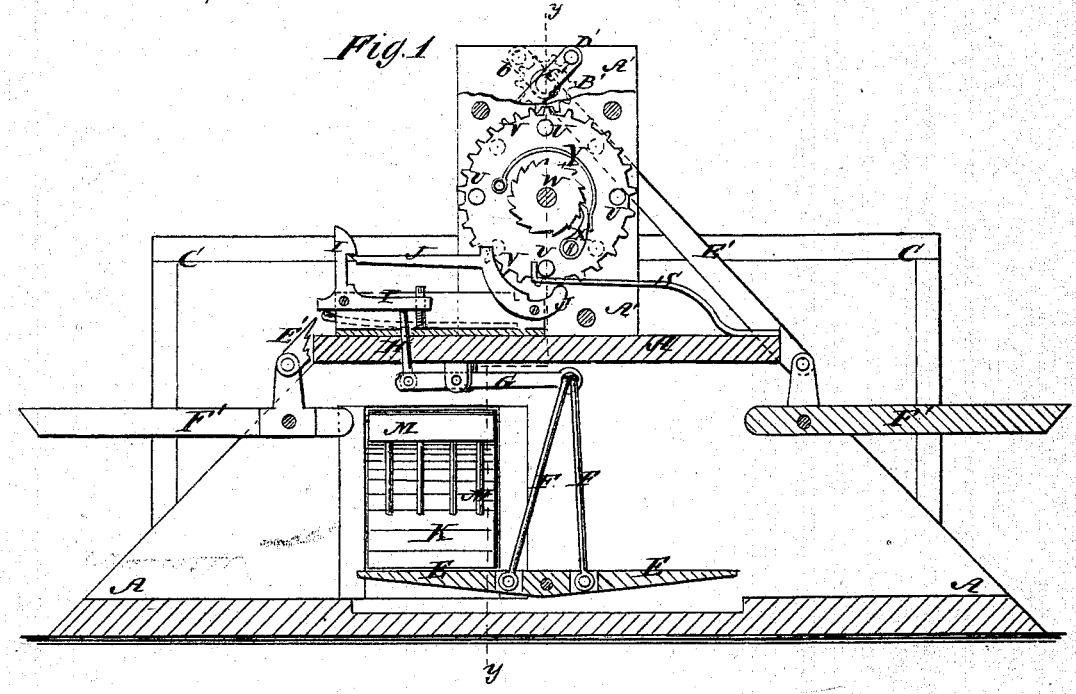
Figure 2:
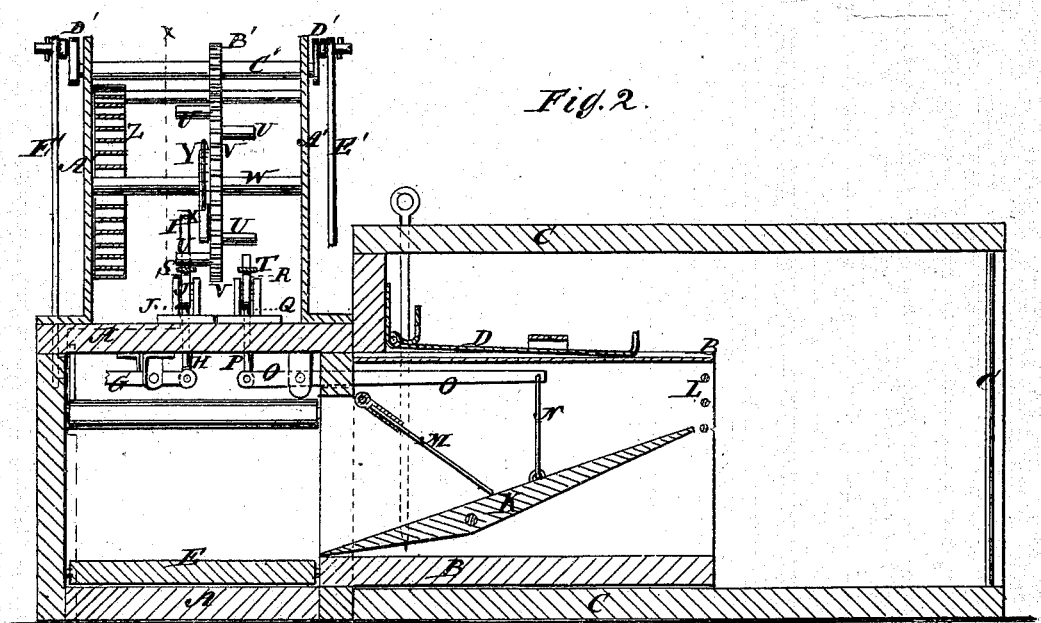

Be it known that I, JOHN GOULD, of Clinton, in the county of Allegheny and State of Pennsylvania, have invented a new and useful Improvement in Animal-Trap, of which the following is a specification:

Figure 1 is a detail section of my improved trap taken through the line $x\ x$, Fig. 2. Fig. 2 is a detail section of the same taken through the line $y\ y$, Fig. 1.

Similar letters of reference indicate corresponding parts.

My invention has for its object to furnish an improved animal-trap, which shall be so constructed that the entrance of the animal will reset the trap for the next animal, and which shall be simple in construction and not liable to get out of order. The invention consists in the combination of the pivoted or tilting platforms, the connecting-rods, the levers, the pivoted rods, the bent-lever catches, the cam-levers, the stop-springs, the gear-wheel having pins projecting alternately from its opposite sides, the coiled spring, the small gear-wheel, its shaft and cranks, and the connecting-bars with each other and with the three boxes, the drop-doors, and wire drop-gate, as hereinafter fully described.

A is a small rectangular box, made with inclined and open ends. In the middle part of one side of the box A is formed an opening in which is secured the end of a short rectangular box, B, which is made open at both ends, and is designed to be slipped into a hole in the side of the box or cage C, one side of which may be a grating and which is provided with a drop-door, D, which is hinged at its upper edge so as to drop or swing down as the box B is withdrawn, and thus close the opening through the side of the box C. The door D may be secured when closed by a rod or bar slipped in through a hole in the top of the box C, and through keepers attached to the door D. In the middle part of the bottom of the box A is placed a tilting platform, E, which is pivoted at the center of its side edges to the sides of the said box A. To the platform E upon the opposite sides of its axis are attached the lower ends of two rods, F, the upper ends of which are pivoted to the end of the lever G, which is pivoted to a support attached to the top of the box A. To the other end of the lever G is pivoted the lower end of a short rod, H, which passes up through a guide-hole in the top of the box A, and its upper end rests against the lower side of the horizontal arm of the right-angled catch-lever I, which is pivoted at its angle to supports attached to the top of the box A, and is held up by a spring. Upon the upper end of the lever I is formed a catch to take hold of the end of a cam-lever, J. To the lower end of the lever I is attached a set-screw for regulating the throw of the lever-catch I. In the lower part of the box B is pivoted a tilting platform, K, which, when left free, takes an inclined position, as shown in Fig. 2, so that an animal cannot pass from the box C through the box B. The upper edge of the platform K does not reach to the top of the box B, so that light may pass in from the box C. The end of the box B, above the edge of the platform K, is guarded by cross-bars or a grating, L. M is a wire drop-gate, hinged to the box A at the upper edge of the opening into the box B. The lower ends of the wires of the gate M are pointed, and rest upon the platform K, so that, should the animals in the cage C succeed in lowering the platform K, they cannot raise the gate M, and thus pass back into the box A. To the pivoted platform K, above its axis, is pivoted the lower end of the rod N, the upper end of which is pivoted to the end of the lever O, which is pivoted to a support attached to the top of the box A. To the other end of the lever O is pivoted the lower end of a short rod, P, which passes up through a guide-hole in the top of the box A, and rests against the horizontal arm of the catch-lever Q, which catches upon and holds the cam-lever R. The catch-lever Q and cam-lever R are constructed and arranged in exactly the same way, and are parallel with the catch-lever I and cam-lever J. Upon the inner ends of the cam-levers J R rest respectively the inner ends of the springs S T, the outer ends of which are attached to the top of the box A, and which when the outer ends of the cam-levers J R are freed from the lever-catches I Q, press the inner ends of said cam-levers J R downward, to allow the pins U of the wheel V to pass. The inner ends of the springs S T are bent upward to form stops, which alternately receive and hold the alternate pins U when the inner ends of the levers J R are raised. The wheel V has teeth formed upon its rim or edge and is placed upon the shaft W, with which it is connected by a spring-pawl, X Y, so that the shaft W may be turned in one direction freely to wind up the spring Z, but when turned in the other direction will carry the said wheel V with it. Z is a spring, which is coiled around the shaft W, and one end of which is attached to said shaft W. The other end of the spring Z is attached to the frame-work A', which supports the wheels and shafts, and which is attached to the top of the box A. The teeth of the gear-wheel V mesh into the teeth of the small gear-wheel B' attached to the shaft C', which revolves in bearings in the upper part of the frame A'. To the ends of the shaft C' are attached short cranks D', to which are pivoted the upper ends of the connecting-bars E', the lower ends of which are pivoted to the doors F', which close the inclined open ends of the box A, and which are pivoted at or near their upper edges to the sides of the box A.

By this construction, when the trap is set the various parts are in the position shown in Fig. 1. As the animal enters the box A and steps upon the platform E he tilts said platform, which draws back the catch-lever I and allows the wheel V to be revolved by the spring Z until the next pin, U, upon the other side of the wheel V, strikes the other stop-spring, T. This movement closes the doors F' and leaves the animal shut up in the box A. The animal then sees light entering through the box B, and trying to reach it he raises the gate M, steps upon and operates the trip-platform R, and passes into the box C, whence he cannot escape. This movement withdraws the catch-lever Q, and allows the wheel V to revolve until the next pin upon its other side strikes against the other stop-spring, S, opening the doors F', and again setting the trap.

Having thus described my invention, I claim as new and desire to secure by Letters Patent—

The combination of the pivoted or tilting platform E K, connecting-rods F N, levers G O, pivoted rods H P, bent lever-catches I Q, cam-levers J R, stop-springs S T, gear-wheel V having pins U projecting alternately from its opposite sides, coiled spring Z, gear-wheel B', shaft C', cranks D', and connecting-bars E' with each other and with the three boxes A B C, drop-doors F', and wire drop-gate M, substantially as herein shown and described.

JOHN GOULD.

Witnesses:
 JOHN A. SHILLITO,
 JOHN H. McMURTRIE.